United States Patent [19]

Jager

[11] Patent Number: 4,982,633

[45] Date of Patent: Jan. 8, 1991

[54] FACING HEAD WITH MASS BALANCING

[75] Inventor: Herbert Jager, Sinsheim, Fed. Rep. of Germany

[73] Assignee: GTE Valenite Corporation, Troy, Mich.

[21] Appl. No.: 450,708

[22] Filed: Dec. 14, 1989

[51] Int. Cl.$^5$ ............................................. B23B 29/34
[52] U.S. Cl. ........................................ 82/123; 82/1.2; 82/131
[58] Field of Search ................... 82/1.2, 1.3, 1.4, 903, 82/124, 123, 130, 131; 408/181

[56] References Cited

U.S. PATENT DOCUMENTS

| | | | |
|---|---|---|---|
| 3,824,883 | 7/1974 | Wloszek | 82/1.2 |
| 4,040,315 | 8/1977 | Bellingham | 82/131 |
| 4,509,236 | 4/1985 | Morita | 82/131 |
| 4,626,149 | 12/1986 | Holy et al. | 82/131 |
| 4,672,868 | 6/1987 | Rawle | 82/1.2 |

Primary Examiner—Frederick R. Schmidt
Assistant Examiner—Blynn Shideler
Attorney, Agent, or Firm—Bill C. Panagos; Robert E. Walter

[57] ABSTRACT

A facing head is described comprising two slides which are arranged adjacent each other in a radial plane and on a tool adjustment for active force balancing. The slides are formed as two parallel connecting links (couplers) between two double-armed cranks of a parallel crank mechanism. On tool adjustment, the slides are moved simultaneously and oppositely to each other while they describe a part of a circular path. Guiding of the slides reduces the influence of the centrifugal force on the slide drive force. The cutting angles of tool cutting edges disposed on the slides, therefore, change only slightly on tool adjustment.

13 Claims, 1 Drawing Sheet

FACING HEAD WITH MASS BALANCING

BACKGROUND OF THE INVENTION

A facing or surface turning head of this type is known from U.S. Pat. No. 3,824,883. This patent discloses a facing head where adjacently disposed slides, each equipped with a tool, are guided rectilinearly in the base body so that on tool adjustment, they execute a rectilinear (opposite) movement. An advantage of this construction is that the mass balancing takes place in the same axially defined radial plane. A disadvantage is that centrifugal force is generated during operation on the slides and must be overcome for adjustment. It must be remembered that the centrifugal force changes proportionally with the radial distance of the slides from the tool spindle axis. When the center of gravity of the slides traverses the tool spindle axis, a force direction reversal occurs which frequently disadvantageously manifests itself in the turned surface of the workpiece to be machined. The consequences are not only correspondingly large dimensions of the actuator and other components of the facing head but also greater stress on the bearings, increased surface load of the sliding faces, greater lubrication consumption and an irregular turning picture on the workpiece to be machined due to changing types of stress and load.

The above problems resulting from the centrifugal forces are also common to facing heads where slides actively serve as force balancing means positioned axially behind each other (as for example shown in DE-OS No. 3,408,352), or where slides are arranged centrally within each other as is disclosed in German Patent Application No. P 39 10 677.

Of course, the difficulties due to the centrifugal forces are particularly serious with high-speed facing heads, or facing heads with large diameter; both of which are being increasingly employed to obtain high-cutting speeds.

The journal "tz fuer Metallbearbeitung", 76th edition (1982), No. 3, p. 24–26, discloses a facing head in which the two slides serving for the mass compensation are not linearly displaced on tool adjustment but turned about an axis fixed with respect to the base body. Once these rotary slides are balanced with respect to their axis of rotation, the center of gravity of the rotary slides retains its position during the rotation; as a result no turning moment is developed and the drive force remains constant. The centrifugal forces of the rotary slides thus have no influence on the drive force. However, a disadvantage is that the cutting angles on tool adjustment change considerably because the tool cutting edge moves on a circular path. These relatively large cutting angle changes give poor cutting conditions, unstable cutting edges due to smaller wedge angle, and different surface qualities. The rotatability of the slides further results in a difficult design due to complex kinematics, an irregular advance per revolution, and inexact feed in longitudinal turning operations.

The invention is based on the problem of providing a facing head having two slides movable oppositely for mass balancing in which the centrifugal forces generated by the slides do not have any disadvantageous influence on the drive force for adjusting the slides and nevertheless an excessive change of the cutting angles on tool adjustment is avoided.

This problem is solved by the invention as found in claim 1.

A parallel crank mechanism is of course a "four-bar linkage" having two cranks which are rotatable about two spaced apart fulcrums and at their free ends are connected together by a connecting link (coupler), the two cranks having the same length and the distance between the fulcrums of the cranks being equal to the length of the connecting link. On a rotary movement of the cranks, each point of the connecting link likewise executes a rotary movement, but the connecting link remains parallel to itself.

In the facing head constructed according to the invention, a "double-sided" parallel crank mechanism is provided, the two cranks of which are made double-armed and carry at their free ends two connecting links forming the slides. Since the two slides are connected together via the cranks, the centrifugal forces generated by the slides do not have any influence on the drive force for adjusting the slides. When a tool adjustment is made, the slides remain parallel to themselves. On tool adjustment, the tool cutting edges change only slightly from cutting edges provided on the slides. In addition, the facing head formed according to the invention is distinguished by constructional simplicity, high function reliability and low production expenditure.

The invention is particularly suitable for high-speed facing heads or facing heads of large diameter.

Advantageous further developments of the invention are set forth in the subsidiary claims.

An example of embodiment of the invention will be explained with the aid of the drawings, wherein.

Figure 2:
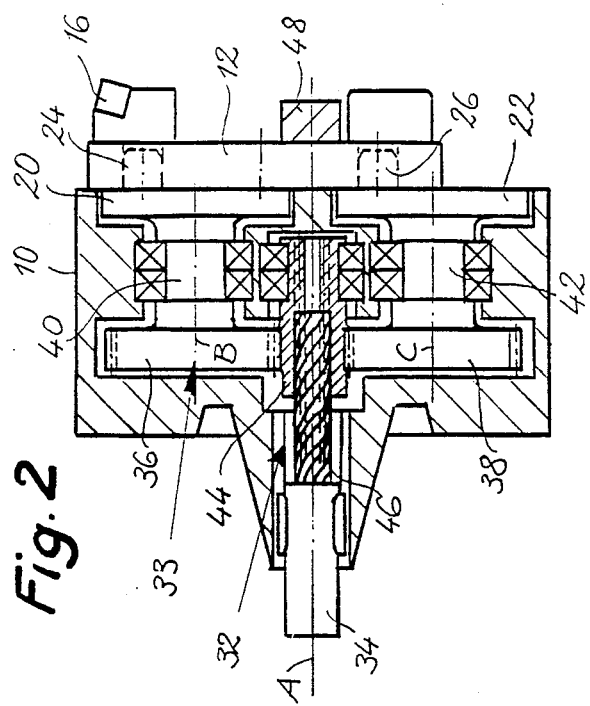
FIG. 2 is a longitudinal section through the facing head looking in the direction of the arrows II of FIG. 1.
Figure 1:
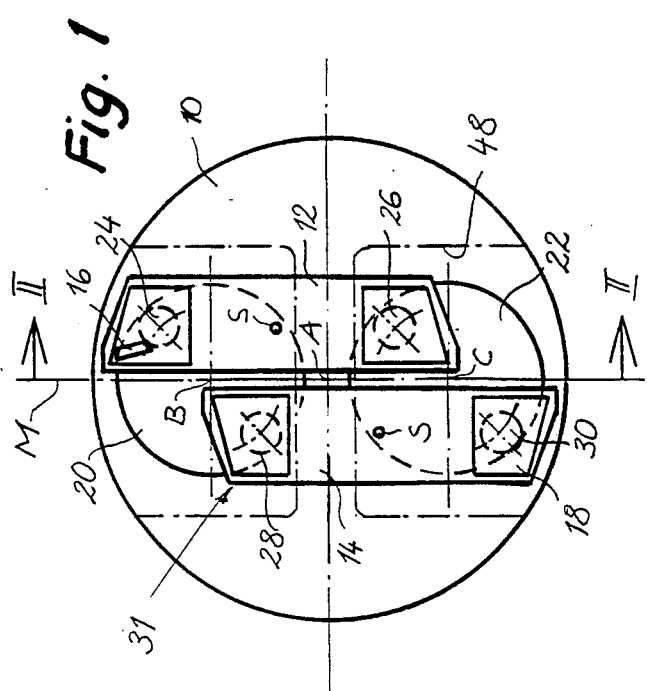
FIG. 1 is an end elevation of a facing head.

The facing head shown in FIGS. 1 and 2 have a base body 10 adapted to be secured to a tool spindle (not shown) and rotating with the latter about the tool spindle axis A. The base body 10 carries two slides 12, 14. At least one of the two slides 12, 14 is provided with a schematically indicated cutting tool 16 and 18 for facing operations; the other slide may either likewise be provided with a cutting tool or with a corresponding counterweight.

A tool adjustment is made by a corresponding movement of the respective slide. For mass balancing, the two slides are moved simultaneously and oppositely as will be explained exactly below.

In the base body 10, a double-armed crank 20 is rotatable about a fixed axis B and a double-armed crank 22 rotatable about a fixed rotation axis C. The slide 12 is articulately connected on the one hand via a crank pin 24 to the crank 20 and on the other hand via a crank pin 26 to the crank 22. The slide 14 is likewise articulately connected via crank pins 28, 30 to the double-armed cranks 20 and 22.

The arrangement here is such that the crank axes B and C lie in a center plane M extending through the tool spindle axis A and have the same distance from the tool spindle axis A. The connecting line between the crank pins 24 and 26 and the connecting line between the crank pins 28 and 30 and, thus, the two slides 12, 14 are arranged parallel and with the same distance from the center plane M. The two crank pins 24, 28 and 26, 30 of each of the double-armed cranks 20 22 are offset by 90° to each other with respect to the associated crank axis B or C, i.e., they each lie on a common diameter line. The four crank ends 24, 26 28, 30 thus form the corners of a parallelogram of which the center point lies on the tool spindle axis a.

The two slides 12, 14 thus form the connecting links (couplers) of two double-armed cranks 20, 22 of a parallel crank mechanism 31. As a result, the two slides 12, 14 are guided in such a manner that on a common rotational movement of the two cranks 20, 22, they describe a part of a circular path while, however, retaining their parallel position. Their movement approximates to a linear displacement. On a tool adjustment, the cutting angle of the cutting tool carried by the slides changes only slightly.

For turning the cranks 20, 22 and adjusting the slides 12, 14, and actuator 32 is provided. The actuator 32 comprises a gear-type mechanism 33 which converts an axial reciprocating movement of a centrally disposed actuating rod 34 into a rotary movement of the cranks 20, 22.

The gear-type mechanism 33 comprises two spur gears 36, 38, of which the spur gear 36 is non-rotatably connected via a shaft 40 to the crank 20 and the spur gear 38 non-rotatably connected via a shaft 42 to the crank 22. The shaft 40, the spur gear 36, and the cranks 20 are mounted rotatably about the axis B by means of (schematically indicated) shaft bearings in the base body 10 and the shaft 42 together with the spur gear 38 and the crank 22 are likewise rotatably mounted about the axis C by means of shaft bearings.

The spur gears 36 and 38 are in engagement with a centrally disposed spur gear 44 which by means of (schematically indicated) bearings is rotatable about the tool spindle axis A. The central spur gear 44 is in engagement via a steep thread 46 with the non-rotatably guided actuating rod 34.

Both the double-armed cranks 20, 22 are constructed as circular discs which conveniently have the same diameter as the spur gears 36 and 38. The crank pins 24, 26, 28, and 30 each project from the one side of the associated cranks 20 and 22 and engage in corresponding bores of the slides 12, 14. The slides 12, 14 are held on their crank pins by a cover plate 48 which is secured to the base body.

In operation for tool adjustment, the actuating rod 34 is axially displaced. The gear-type mechanism 33 converts this axial movement into a corresponding rotational movement of the cranks 20, 22. As a result, the two slides 12, 14 are moved simultaneously and oppositely in the manner described above. The centers S of gravity of the slides 12, 14 which are each located in the center between the two associated crank pins 24, 26 and 28, 30 likewise move simultaneously and oppositely. This ensures a mass balancing. Since the slides 12, 14 are connected together via the double-armed crank 20, 22, the centrifugal forces generated by the slides do not oppose an adjustment of the cranks 20, 22. This means that the centrifugal forces do not have any influence on the drive force to be applied by the actuating rod 34. The actuator 32 and, in particular, the gear-type mechanism 33 can be made relatively light and the bearing loads and gear face pressures are comparatively small.

Figure 3:
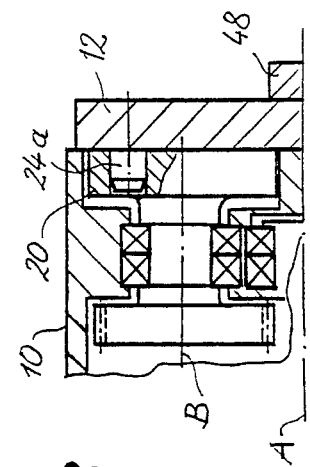

In the example of embodiment of FIGS. 1 and 2, the crank pins are integrally formed on the associated cranks and rotatably mounted in bores of the slides. In contrast, in the example of embodiment of FIG. 3, crank pins (cf. crank pins 24a) are integrally formed on the slides and rotatably mounted in bores of the cranks.

Figure 4:
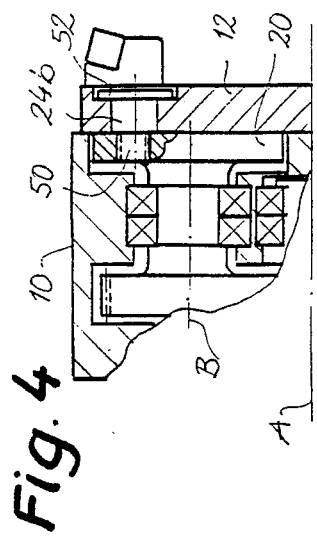
FIGS. 3 and 4 show variants of the facing head of FIGS. 1 and 2.

Whereas, in the examples of embodiment described so far, the crank pins are integrally formed on the associated parts, in the example of embodiment of FIG. 4, the crank pins (cf. crank pins 24b) are each screwed by means of an integrally formed threaded pin 50 to the associated cranks. At their other end, the crank pins are provided with widened extensions 52 which axially retain the slides. Thus, in the example of embodiment of FIG. 4, the cover plate 48 provided in the previous examples of embodiment may be dispensed with.

We claim:
1. A facing head for a machine tool, comprising:
(a) a base body;
(b) a tool spindle having an axis of rotation, said body being rotatable with the tool spindle about the tool spindle axis;
(c) two slides of which at least one carries a tool, said slides arranged adjacent each to other in the base body in a radial plane perpendicular to the tool spindle axis;
(d) an actuator which serves for tool adjustment and which moves the two slides for active force balancing simultaneously and in opposite directions to each other; and
(e) a parallel crank mechanism having two double armed cranks which are each rotatable by the actuator about an axis to describe a circular path, said cranks connected to the slides by crank pins and engage the slides so that the slides are formed as connecting links between the double armed cranks and the parallel crank mechanism and each point of the slides describe a part of the circular path.

2. The facing head according to claim 1, wherein the crank axis lie in a center plane running through the tool spindle axis and have the same radial distance from the tool spindle axis.

3. The facing head according to claim 2, wherein each double armed crank for articulate connection of the connecting links forming the slides comprises two crank pins which are offset with each other by 180° with respect to the crank axis associated therewith.

4. The facing head according to claim 3, wherein the connecting links forming the slides are arranged with the same distance from the center plane.

5. The facing head according to claim 4, wherein the centers of gravity of the slides each lie in the middle between the two associated crank pins.

6. The facing head according to claim 5, wherein each of the double-armed cranks is constructed as a circular disc.

7. The facing head according to claim 6, wherein the crank pins are disposed on the crank discs and rotatably mounted in bores of the two slides.

8. The facing head according to claim 6, wherein the crank pins are disposed on the slides and rotatably mounted in bores of the crank discs.

9. The facing head according to claim 8, wherein the slides are axially held on the base body by a cover plate.

10. The facing head according to claim 8, wherein the slides are axially held on the base body by broadened extensions of the crank pins.

11. A facing for a machine tool, comprising:
(a) a base body;
(b) a tool spindle having an axis of rotation, said body being rotatable with the tool spindle about the tool spindle axis;

(c) two slides of which at least one carries a tool, arranged adjacent to each other in the base body in a radial plane perpendicular to the tool spindle axis;

(d) an actuator which serves for tool adjustment and which moves the two slides for active force balancing simultaneously and in opposite directions to each other; said actuator comprising a gear type mechanism which converts an axial reciprocating movement of an actuating rod into rotary movement; and (e) a parallel crank mechanism having two double armed cranks which are each rotatable by the actuator about an axis, said axis located in a center plane running through the spindle axis and having the same radial distance from the tool spindle axis, said crank rotation to describe a circular path, said slides having a center of gravity and connected to said cranks by crank pins, said crank pins having broadened extensions to axially hold the slides to the base body, said pins being offset with each other by 180° with respect to each associated crank axis, said slides form a connecting link arranged with the same distance from the center plane, said slides each having a center of gravity which lies in the middle between two associated crank pins; said double-armed cranks constructed as circular discs and the crank pins are disposed on the slides and rotatably mounted in bores in the crank discs said rotary movement of the cranks accomplished by reciprocating movement of the activating rod.

12. The facing head according to claim 11, wherein the gear type mechanism comprises two spur gears which are non-rotatably connected to the cranks and driven by a central spur gear.

13. The facing head according to claim 12, wherein the central spur gear is in engagement with a steep thread with the non-rotatably arranged actuating rod.

* * * * *